| United States Patent [19] | [11] | 4,077,530 |
|---|---|---|
| Fukusen et al. | [45] | Mar. 7, 1978 |

[54] METHOD FOR CATALYST CHARGING TO TUBULAR REACTOR

[75] Inventors: Hiroshi Fukusen; Hironori Yamanaka; Sachio Oishi; Michito Nakao, all of Niihama, Japan

[73] Assignee: Sumitomo Chemical Company, Limited, Osaka, Japan

[21] Appl. No.: 695,033

[22] Filed: Jun. 11, 1976

[30] Foreign Application Priority Data

Jun. 27, 1975 Japan .................................. 50-80294

[51] Int. Cl.$^2$ .............................................. B65G 69/16
[52] U.S. Cl. ................................ 214/152; 23/288 M; 48/214 A; 208/152; 214/17 C
[58] Field of Search .................... 208/146, 152; 141/2, 141/12; 214/17 C, 17 CB; 23/288 E, 288 M

[56] References Cited

U.S. PATENT DOCUMENTS

| 3,562,998 | 2/1971 | Edwards | 214/17 C |
|---|---|---|---|
| 3,668,115 | 6/1972 | Uhl et al. | 208/152 |

*Primary Examiner*—Herbert Levine
*Attorney, Agent, or Firm*—Birch, Stewart, Kolasch and Birch

[57] ABSTRACT

A method for charging a catalyst in particles to a tubular reactor having many vertically arranged reactor tubes of a definite length, which comprises inserting a wire formed in an optional shape into each reactor tube at the upper opening thereof, supplying the catalyst particles to the reactor tube to allow them to fall along the wire and gradually withdrawing the wire with or without vertical fluctuation as the height of the filled catalyst layer increases, thereby slowing down the falling velocity of the catalyst particles to prevent them from being crushed or powdered and at the same time obtaining a uniform bulk density of the filled catalyst.

5 Claims, No Drawings

METHOD FOR CATALYST CHARGING TO TUBULAR REACTOR

BACKGROUND AND SUMMARY OF THE INVENTION

The present invention relates to a method for charging a catalyst in particles to reactor tubes vertically arranged in a tubular reactor.

In a tubular reactor comprising a plural number of reactor tubes arranged in parallel and packed with catalyst particles, the amount and bulk density of the filled catalyst must be substantially the same or equal to each reactor tube. For example, in the case of an external heating reactor for steam reforming of hydrocarbons, different amounts and bulk densities of the catalyst in the reactor tubes make a difference among the amounts of the gas passing through the reactor tubes. As the results, an amount of the heat absorbed by the reaction becomes low in the reactor tubes having a low degree of gas-passage, whereby the temperatures of the catalyst layer and the skin temperature of the reactor tube increase and the so-called super-heating phenomenon becomes easy to occur. Further, when the bulk density of the catalyst in a reactor tube is not uniform, for example, by the formation of a void which is owing to the bridging of the catalyst particles in the reactor tube, a local reduction of the heat absorption occurs and the super-heating phenomenon appears likewise. In such a super-heating state, the objective reaction products can not be obtained and moreover there appear various undesirable problems, for example, deterioration of the performance as a catalyst, crushing and powdering of catalyst particles due to the reduction in the mechanical strengths, occurrence of side reactions such as carbonization, reduction of the mechanical strengths of reactor tube materials and the like.

Catalyst particles are porous in general and have a limited mechanical strength. In charging such catalyst particles, an impulsive strength is considered as an important physical property of the catalyst particles. The allowable free falling distance of catalyst particles is defined as a maximum vertical distance which the particles can cover without damage when allowed to fall freely and to collide with a surface having the same hardness as that of the particles. When the catalyst particles contain deformed particles owing to crushing and powdering, it causes non-uniformity of the bulk density of the catalyst in the tube. It is therefore necessary in catalyst charging to pay attention not to allow the catalyst particles to fall down from a height of more than the allowable free falling distance.

When catalyst particles are allowed to fall into a vertically set reactor tube at the upper opening thereof, the following formulae are valid:

$$t = \sqrt{2h/g}$$

$$V = \sqrt{2gh}$$

where $h(m)$ is a distance between the upper opening of the reactor tube and the catalyst receiver placed in or the upper surface of the catalyst layer previously charged in the reactor tube, $t$(sec) is a time required for the freely falling catalyst particles to cover the distance, $V(m/\text{sec})$ is a velocity of the catalyst particles immediately before collision and $g(m/\text{sec}^2)$ is a gravitational acceleration. When the free falling distance, $h(m)$, becomes large and exceeds the allowable free falling distance, $hcp(m)$, of the catalyst particles, the impact force generated at collision is beyond the impulsive strength of the catalyst particles, which leads to crushing and powdering of the particles. In this case, however, if the impact force at collision can be reduced to lower than the impulsive strength by slowing down the falling velocity of the particles by a suitable means, fall-charging of the catalyst particles becomes possible.

A well-known method for velocity reduction is the one wherein the particles are allowed to fall down in a liquid such as water or oil. However, this method is not considered as effective in all cases, because the catalyst sometimes decreases in the activity and mechanical strengths owing to the impregnation of the catalyst with the liquid.

One method for charging reactor tubes in a tubular reactor with catalyst particles is disclosed, under the name of "sock" method, in "Catalyst Handbook", pp. 168, published from Wolf Scientific Books in 1970. In this method, the catalyst particles are first put in a fabric tube, or sock, sized so that the filled sock slides easily inside the reactor tube. A definite length of the sock at the bottom end is folded up to hold the catalyst in place while the sock is lowered into the tube. When the sock has reached the catalyst receiver or the upper surface of the catalyst layer previously charged, the sock is withdrawn gently whereby the folded bottom opens to allow the catalyst particles in the sock to fall down and the reactor tube is charged with the particles. The charged reactor tube is vibrated in order to eliminate voids formed by the bridging of catalyst particles and thereafter the height of the catalyst layer in each reactor tube is measured in order to confirm whether or not the catalyst is uniformly filled. When the reactor tube is long, a series of the operations described above is carried out repeatedly. However, this sock method requires a close attention and skill in the operation and moreover a long period of operation time.

In view of the situation described above, the inventors have extensively studied a method for charging a reactor tube with catalyst particles which is free from the defects of conventional charging methods and gives a uniform packing density by a simple operation and in a short period of operation time. As a result, it has now been found that this object can easily be achieved by hanging down a wire formed in an optional shape into the reactor tube and allowing catalyst particles to fall into the tube along the wire.

The present invention provides a method for charging a catalyst in particles to a tubular reactor having a plural number of vertically arranged catalytic reaction tubes of a definite length, which comprises inserting a wire of an optional shape into each reactor tube at the upper opening thereof, supplying the catalyst particles to the tube to allow them to fall along the wire and gradually withdrawing the wire with or without vertical fluctuation as the height of the filled catalyst layer increases, thereby slowing down the falling velocity of the catalyst particles to prevent them from being crushed or powdered and at the same time obtaining a uniform bulk density of the filled catalyst.

The following experiments carried out by the inventors will serve to illustrate well the invention.

The hollow catalyst particles having an external diameter of 16.5 mm and a height of 16.5 mm (average weight: 6.32 g/particle) were allowed to fall into a centrifugal casting reactor tube having an internal diameter of 86 mm and an effective length, L, of 11.28 m, using a spiral piano wire as a velocity-reducing resistor. Two kinds of piano wire (diameter: 3.0 mm$\phi$ and 4.0 mm$\phi$) were wound into a spiral form having an internal diameter of 50 mm and a pitch of 300 mm with the direction of spiral reversed every one meter. The supply of the catalyst particles was carried out in three ways: with (1) no fluctuation, (2) slow vertical fluctuations of the piano wire hung down in the reactor tube and (3) without the piano wire. Table 1 shows the falling time, $t$(sec), measured for each case. In the table, Vm($m$/sec) is a mean falling velocity, $hf_{min}$(m) and $hf_{max}$(m) are free falling distances which the catalyst particles have covered until the velocity of the particles reach the mean falling velocity (V$m$) and two times that of the velocity, respectively. These values are calculated from the following formulae:

$Vm = L/t$
$(hf)_{min} = (Vm)^2/2g$
$(hf)_{max} = 2(Vm)^2/g$

Table 1:

| No. | Method for velocity reduction | Falling test t(sec) | Vm(m/sec) | (hf)$_{min}$(m) | (hf)$_{max}$(m) |
| --- | --- | --- | --- | --- | --- |
| 1 | Free falling (without the resistor) | 1.52 | 7.42 | 2.81 | 11.28 |
| 2 | One spiral piano wire (3.0 mm$\phi$) inserted (no fluctuation) | 4.05 | 2.79 | 0.40 | 1.59 |
| 3 | One spiral piano wire (3.0 mm$\phi$) inserted (vertical fluctuation) | 4.23 | 2.67 | 0.37 | 1.46 |
| 4 | One spiral piano wire (4.0 mm$\phi$) inserted (no fluctuation) | 5.07 | 2.23 | 0.26 | 1.02 |
| 5 | One spiral piano wire (4.0 mm$\phi$) inserted (vertical fluctuation) | 5.26 | 2.14 | 0.24 | 0.94 |

From the above results, it is understood that, by properly selecting the shape and number of the wire used as a resistor, the reduction of the falling velocity as well as the reduction of the impact force at collision to lower than the impulsive strength of the catalyst particles become possible in either case of vertical fluctuations or no fluctuation of the wire.

The wire to be used as a resistor in the present invention may be made of any material which is not deformed by and resistant to the impact by the catalyst particles falling along therewith. Usually the resistor is prepared by forming one or more of metal wires (e.g. steel wire) into an appropriate shape, preferably the one which can be readily inserted in the reactor tube and fluctuated vertically. Examples of such shape are broken line-like, wave-like, saw tooth-like, spiral-like, etc. The shape of the resistor may be similar to these shapes or the combination thereof. Further, these shapes may be formed relatively regularly or irregularly. For example, as for a steel wire having a spiral shape, the internal diameter and pitch thereof may be irregular to some extent and the direction of spiral may be reversed every certain length.

One or more of the wire optionally shaped in this way are hung down into each of vertically arranged reactor tubes at the upper opening thereof and a definite amount of catalyst particles previously weighed is gradually allowed to fall into the tubes along the wire. During that time, the wire is gradually pulled up, with vertical fluctuations or no fluctuation, according to an increase of the height of the catalyst layer so that the wire is not buried in the layer. The catalyst particles slow down the velocity in the course of falling by contact with the wire or tube wall. Therefore, the particles are not crushed nor powdered and further form no bridging, consequently a uniform and large packing density can be obtained.

As described above, the method of the present invention comprises inserting an optionally shaped wire into each of reactor tubes of a definite length which are vertically arranged in a tubular reactor, and charging the reactor tubes with catalyst particles by supplying them along the wire, during which the wire is gradually pulled up, with vertical fluctuations or no fluctuation, as the height of the filled catalyst layer increases. Consequently, the operation of charging catalyst particles into reactor tubes becomes simple and easy and further the operation time is shortened to a large extent. At the same time, crushing and powdering of the catalyst particles become low and a uniform bulk density of catalyst is easily obtained. Therefore, in a plant with a tubular reactor, a period of operation-stop required for an exchange of the catalyst is largely shortened and at the same time good results are obtained in maintenance and control of the tubular reactor.

The present invention will be illustrated more specifically with reference to the following examples, which are not intended to limit the present invention thereto.

EXAMPLE 1

According to the method of the present invention and to the well-known sock method as a reference, the hollow, cylindrical catalyst particles having a diameter of 16.5 mm, a height of 16.5 mm and a mean weight of 6.32 g-particle were charged in a reactor tube having a length of 11.282 m and internal diameters of 64 mm and 86 mm at the upper opening and at the part to be charged with the catalyst, respectively.

The method of the present invention:-

Piano wire of 4 mm in diameter was shaped into a spiral having an internal diameter of 50 mm and a pitch of 300 mm with the direction of spiral reversed every one meter. The steel wire thus shaped was inserted into the reactor tube and then 5 kg of the catalyst was gradually allowed to fall into the reactor. During that time, the steel wire was pulled up with vertical fluctuations, as the height of the filled catalyst layer increases. For comparison with the sock method, 5 kg of the catalyst was supplied six times (30 kg in total) and the height of the charged catalyst layer was measured. After vibrating the reactor tube for 20 seconds by means of an air vibrator, the height of the catalyst layer was measured again. Thereafter 20 kg of the catalyst was further charged into the reactor by the method described above and then the measurement, vibration and re-measurement were carried out. Finally, the catalyst was supplemented to the height 700 mm low from the upper opening of the reactor. The amount of the remaining catalyst was measured, from which the amount of the catalyst supplemented was calculated.

The method of the reference (sock method):-

Cloth sock of 55 mm in internal diameter and 2.5 m in length was filled with 5 kg of the catalyst. The lower end of the sock was folded up by about 200 mm and the upper end was joined to a flax rope. The sock was hung down into the reactor. When the sock reached the catalyst receiver or the upper surface of the catalyst layer previously charged, the sock was pulled up to open the folded bottom. The sock was slowly pulled up, with vertical fluctuations, so that the catalyst particles fall down continuously through the sock. This operation was repeated six times to charge the reactor with 30 kg of the catalyst. Thereafter the measurement, vibration and re-measurement were carried out in the same manner as described above. Further, 20 kg of the catalyst was supplied by repeating the operation and then the measurement, vibration and re-measurement were carried out likewise. Finally, the catalyst was supplemented to the height 700 mm low from the upper opening of the reactor. The results of catalyst charging are shown in Table 2.

Table 2

|  | Method of the present invention | Method of the reference (sock method) |
| --- | --- | --- |
| At the time of 30 kg-charging: |  |  |
| Bulk density (kg/m) (before vibration) | 5.222 | 5.182 |
| (after vibration) | 5.228 | 5.198 |
| Sinking rate of catalyst by vibration (%) | 0.11 | 0.30 |
| At the time of 50 kg-charging: |  |  |
| Bulk density (kg/m) (before vibration) | 5.222 | 5.159 |
| (after vibration) | 5.226 | 5.170 |
| Sinking rate of catalyst by vibration (%) | 0.11 | 0.23 |
| Total amount of catalyst charged (kg) | 55.04 | 54.48 |
| Total amount of catalyst broken (kg) | 0.415 | 0.405 |
| Rate of breakage (%) | 0.75 | 0.74 |
| Time (sec) required for one charging operation (5 kg) | 18.0 | 62.4 |

Note: Bulk density is expressed by the amount of the catalyst charged per unit length of the reactor tube.

As is clearly shown from the results, the method of the present invention gives a larger bulk density than the sock method. Further, in the method of the present invention, a time required for charging the catalyst is shorter, the sinking rate after vibration is smaller, and the bulk density is more uniform. Therefore, it becomes possible to omit the measurement and vibration after each charging operation, so that the operation time can be shortened to a large extent.

What is claimed is:

1. A method for charging catalyst particles to a tubular reactor having at least one vertically arranged catalytic reaction tube of a definite length, which comprises inserting at least one wire of an optional shape into the reaction tube at the upper opening thereof, supplying the catalyst particles to the tube at said upper opening and allowing them to fall along the wire in direct and frequent contact with said wire and/or the inner wall of the reaction tube and gradually withdrawing the wire as the height of the filled catalyst layer increases, thereby slowing down the falling velocity of the catalyst particles and preventing them from being crushed or powdered and, at the same time, obtaining a filled catalyst reaction tube having a uniform bulk density.

2. The method according to claim 1, wherein said wire is a steel wire curved in a definite or indefinite shape which is readily inserted into the tube and can be fluctuated, vertically.

3. The method according to claim 2, wherein said wire is regularly or irregularly curved in the shape which is broken line-like, wave-like, saw tooth-like, spiral-like or similar to these shapes or a combination thereof.

4. The method according to claim 1, wherein a plurality of wires are utilized in the tubular reactor.

5. The method according to claim 1, wherein the wire is gradually withdrawn with vertical fluctuations as the height of the filled catalyst layer increases during the time of supplying the catalyst particles into the tube, thereby allowing the catalyst to fall along the wire.

* * * * *